(12) United States Patent
Kim et al.

(10) Patent No.: US 10,761,342 B2
(45) Date of Patent: Sep. 1, 2020

(54) FLOATING HOLOGRAM APPARATUS

(71) Applicant: KT Corporation, Seongnam-si, Gyeonggi-do (KR)

(72) Inventors: Seung Cheol Kim, Seoul (KR); Jong Heum Kim, Seongnam-si (KR); Tae Gil Yang, Seoul (KR); Sang Hoon Han, Gwangmyeong-si (KR)

(73) Assignee: KT Corporation, Seongnam-si, Gyeonggi-Do (KR)

( * ) Notice: Subject to any disclaimer, the term of this patent is extended or adjusted under 35 U.S.C. 154(b) by 23 days.

(21) Appl. No.: 15/856,191

(22) Filed: Dec. 28, 2017

(65) Prior Publication Data

US 2018/0252934 A1    Sep. 6, 2018

(30) Foreign Application Priority Data

Dec. 28, 2016   (KR) .................. 10-2016-0180820

(51) Int. Cl.
*G02B 30/56*    (2020.01)
*G03H 1/00*    (2006.01)
(Continued)

(52) U.S. Cl.
CPC ............. *G02B 30/56* (2020.01); *G02B 30/25* (2020.01); *G02B 30/36* (2020.01); *G03H 1/0005* (2013.01);
(Continued)

(58) Field of Classification Search
CPC ............... G02B 27/22; G02B 27/2228; G02B 27/2242; G02B 27/2271; G02B 27/2278; G02B 27/2285; G02B 27/2292; G02B 27/24; G02B 30/25; G02B 30/26; G02B 30/34; G02B 30/35; G02B 30/36; G02B 30/50; G02B 30/52; G02B 30/54; G02B 30/56; G03H 1/0005; G03H 2001/0088;
(Continued)

(56) References Cited

U.S. PATENT DOCUMENTS 5,583,695 A * 12/1996 Dobrusskin ............. G09F 19/12
                                                           359/630
5,854,706 A * 12/1998 Alb ........................ G02B 30/25
                                                           359/465
(Continued)

FOREIGN PATENT DOCUMENTS

| JP | 2014119607 A | * | 6/2014 |
| KR | 100901866 B1 | | 6/2009 |
| KR | 101489356 B1 | | 2/2015 |

OTHER PUBLICATIONS

English machine translation of JP-2014119607-A (Year: 2014).*

*Primary Examiner* — Nicholas R. Pasko
(74) *Attorney, Agent, or Firm* — Hamre, Schumann, Mueller & Larson, P.C.

(57) ABSTRACT

A floating hologram apparatus includes a display including a first output area to output a first hologram image and a second output area to output a second hologram image and a prism array positioned in front of the display and configured to refract rays of the first hologram image and the second hologram image. The prism array includes multiple prisms of which a first facet to which a ray of the second hologram image is incident and a second facet to which a ray of the first hologram image is incident have different angles.

19 Claims, 13 Drawing Sheets

(51) Int. Cl.
  *G02B 30/25* (2020.01)
  *G02B 30/36* (2020.01)
(52) U.S. Cl.
  CPC . *G03H 2001/0088* (2013.01); *G03H 2210/32* (2013.01); *G03H 2210/56* (2013.01); *G03H 2223/18* (2013.01); *G03H 2223/22* (2013.01)
(58) Field of Classification Search
  CPC ....... G03H 2001/0216; G03H 2210/30; G03H 2210/32; G03H 2210/33; G03H 2223/18; G03H 2223/19
  USPC .................. 359/22, 23, 24, 25, 26, 629, 630
  See application file for complete search history.

(56) References Cited

U.S. PATENT DOCUMENTS

| | | | | |
|---|---|---|---|---|
| 6,481,851 B1* | 11/2002 | McNelley | .............. | G02B 30/56 353/28 |
| 6,697,201 B2* | 2/2004 | Watanabe | .............. | B60K 35/00 359/630 |
| 7,016,116 B2* | 3/2006 | Dolgoff | ................ | H04N 13/346 359/630 |
| 7,139,042 B2* | 11/2006 | Nam | .................... | H04N 13/359 349/15 |
| 7,605,981 B2* | 10/2009 | Adachi | .................. | G02B 30/52 359/629 |
| 7,639,210 B2* | 12/2009 | Wynne-Powell | ............................ | G02B 27/0101 345/32 |
| 7,646,540 B2* | 1/2010 | Dolgoff | .................. | G02B 30/52 359/630 |
| 8,094,184 B2* | 1/2012 | Tomisawa | .............. | G02B 30/34 348/51 |
| 8,300,185 B2* | 10/2012 | Nishihara | ............ | G02B 17/006 349/112 |
| 8,305,678 B2* | 11/2012 | Kuhlman | .......... | G02F 1/133524 359/298 |
| 8,363,325 B2* | 1/2013 | Kuhlman | ............. | H04N 13/305 359/639 |
| 8,434,872 B2* | 5/2013 | Maekawa | .............. | G02B 30/56 353/10 |
| 8,462,081 B2* | 6/2013 | Kuo | ..................... | G02B 17/006 345/1.1 |
| 2003/0067422 A1* | 4/2003 | Suyama | .............. | H04N 13/368 345/6 |
| 2017/0075114 A1* | 3/2017 | Quarta | ...................... | B60R 1/00 |

\* cited by examiner

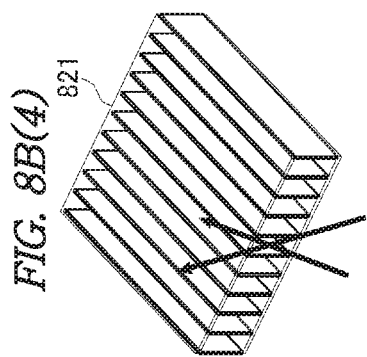
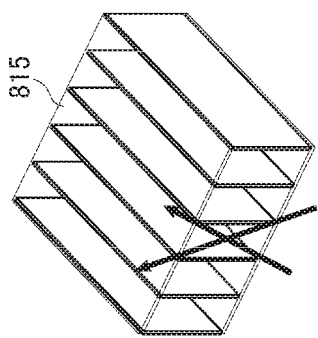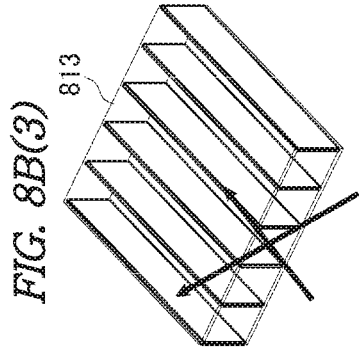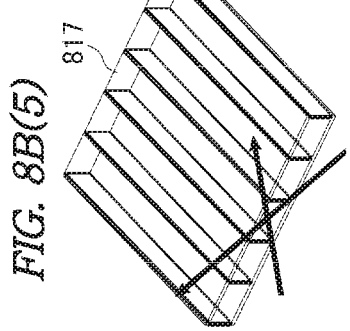
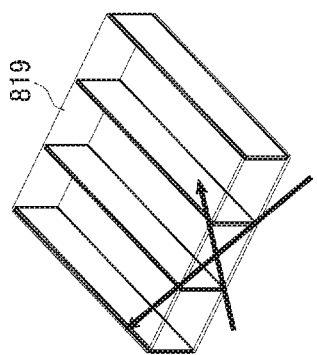

FLOATING HOLOGRAM APPARATUS

CROSS-REFERENCE TO RELATED APPLICATION

This application claims the benefit under 35 USC 119(a) of Korean Patent Application No. 10-2016-0180820 filed on Dec. 28, 2016, in the Korean Intellectual Property Office, the entire disclosures of which are incorporated herein by reference for all purposes.

TECHNICAL FIELD

The present disclosure relates to a floating hologram apparatus.

BACKGROUND

A three-dimensional (3D) stereoscopic image display technology refers to a technology of reconstructing a two-dimensional (2D) image by adding predetermined depth information to the 2D image.

The 3D stereoscopic image display technology uses binocular disparity of human eyes to provide a 3D image. Methods for separating left and right images using the binocular disparity are classified into glasses type and glasses-free type. Examples of the glasses type method may include an anaglyph method, a polarized glasses method, and a shutter glasses method, and examples of the glasses-free type method may include a lenticular method, a parallax barrier method, and an optical plate method. Among these conventional methods, the polarized glasses method and the shutter glasses method are the oldest 3D display methods and have been widely used in 3D movies and 3D TVs. However, the polarized glasses method and the shutter glasses method require wearing special glasses for stereoscopic images and increase eye strain. Among the glasses-free type methods, the lenticular method and the parallax barrier method fix an observer's observation points to low-brightness and low-resolution images and cause headaches or dizziness when the observer constantly watches the images.

Meanwhile, examples of a complete stereoscopic method include a hologram method and a volumetric 3D display method. These complete stereoscopic methods implement only static stereoscopic images through a high-priced laser and precision optical apparatus but cannot provide real-time high-quality stereoscopic images.

Recently, methods for implementing real-time stereoscopic images at low costs by using a half mirror, a concave mirror, a Fresnel lens, a prism array, and the like have been suggested. However, the method using a half mirror reflects an image as a virtual image and requires a large physical size of the system, and the methods using a concave mirror, a Fresnel lens, and a prism array require high manufacturing costs and provide a narrow viewing angle. Particularly, in the case where a stereoscopic image is implemented using a prism array, the image quality may deteriorate.

SUMMARY

In view of the foregoing, the present disclosure provides a floating hologram apparatus capable of simultaneously projecting a first hologram image and a second hologram image. However, problems to be solved by the present disclosure are not limited to the above-described problems. There may be other problems to be solved by the present disclosure.

According to a first exemplary embodiment of the present disclosure, a floating hologram apparatus includes a display including a first output area to output a first hologram image and a second output area to output a second hologram image and a prism array positioned in front of the display and configured to refract rays of the first hologram image and the second hologram image. The prism array includes multiple prisms of which a first facet to which a ray of the second hologram image is incident and a second facet to which a ray of the first hologram image is incident have different angles.

According to an example, a projection position for a floating hologram of the first hologram image and a projection position for a floating hologram of the second hologram image are changed depending on a difference in angle between the first facet and the second facet.

According to an example, the first hologram image is an object image and the second hologram image is a background image.

According to an example, the first facet of each of the multiple prisms has an angle which is greater than an angle of the second facet.

According to an example, the first hologram image is a background image and the second hologram image is an object image.

According to an example, the second facet of each of the multiple prisms has an angle which is greater than an angle of the first facet.

According to an example, the floating hologram apparatus further includes between the display and the prism array, a first filter for controlling a field of view configured to block a ray incident at an angle within a first range among rays of the first hologram image and a second filter for controlling a field of view configured to block a ray incident at an angle within a second range among rays of the second hologram image.

According to an example, the first filter for controlling a field of view is attached to the front of the first output area and the second filter for controlling a field of view is attached to the front of the second output area.

According to an example, a first-type polarizing film is attached to the first output area and a second-type polarizing film having polarized light property orthogonal to the first-type polarizing film is attached to the second output area.

According to an example, the second-type polarizing film is attached to the first facet and the first-type polarizing film is attached to the second facet According to an example, an input shutter to be turned on or off during each predetermined cycle is attached to the display, and an output shutter to be turned on or off is attached to the prism array.

According to an example, a first input shutter of the input shutter is attached to the first output area, a second input shutter of the input shutter is attached to the second output area, and a first output shutter of the output shutter is attached to an upper part of each of the prisms, and a second output shutter of the output shutter is attached to a lower part of each of the prisms.

According to an example, the first input shutter and the second output shutter are turned on while the second input shutter and the first output shutter are turned off during a first cycle.

According to an example, the first input shutter and the second output shutter are turned off while the second input shutter and the first output shutter are turned on during a second cycle different from the first cycle.

According to second exemplary embodiment of the present disclosure, a floating hologram apparatus includes a first display configured to output a first hologram image, a second display configured to output a second hologram image and a prism array configured to refract rays of the first hologram image and the second hologram image. The prism array includes multiple prisms of which a first facet to which a ray of the second hologram image is incident and a second facet to which a ray of the first hologram image is incident have different angles.

According to an example, the first display is positioned above the second display, and the prism array is positioned in front of the first display and the second display.

According to an example, a projection position for a floating hologram of the first hologram image and a projection position for a floating hologram of the second hologram image are controlled depending on a difference in angle between the first facet and the second facet.

According to an example, the first hologram image is an object image and the second hologram image is a background image.

According to an example, the first facet of each of the multiple prisms has an angle which is greater than an angle of the second facet.

According to an example, the first display is positioned in front of the second display.

According to an example, the first hologram image is a background image and the second hologram image is an object image.

According to an example, the second facet of each of the multiple prisms has an angle which is greater than an angle of the first facet According to an example, the second display is positioned in front of the first display According to any one of the above-described exemplary embodiments of the present disclosure, it is possible to provide a floating hologram apparatus capable of simultaneously projecting a first hologram image and a second hologram image.

BRIEF DESCRIPTION OF THE DRAWINGS

FIG. 8A and FIG. 8B (shown collectively as FIGS. 8B(1) to 8B(5)) are diagrams respectively illustrating a filter for controlling a field of view according to an exemplary embodiment of the present disclosure.

DETAILED DESCRIPTION

Figure 1:
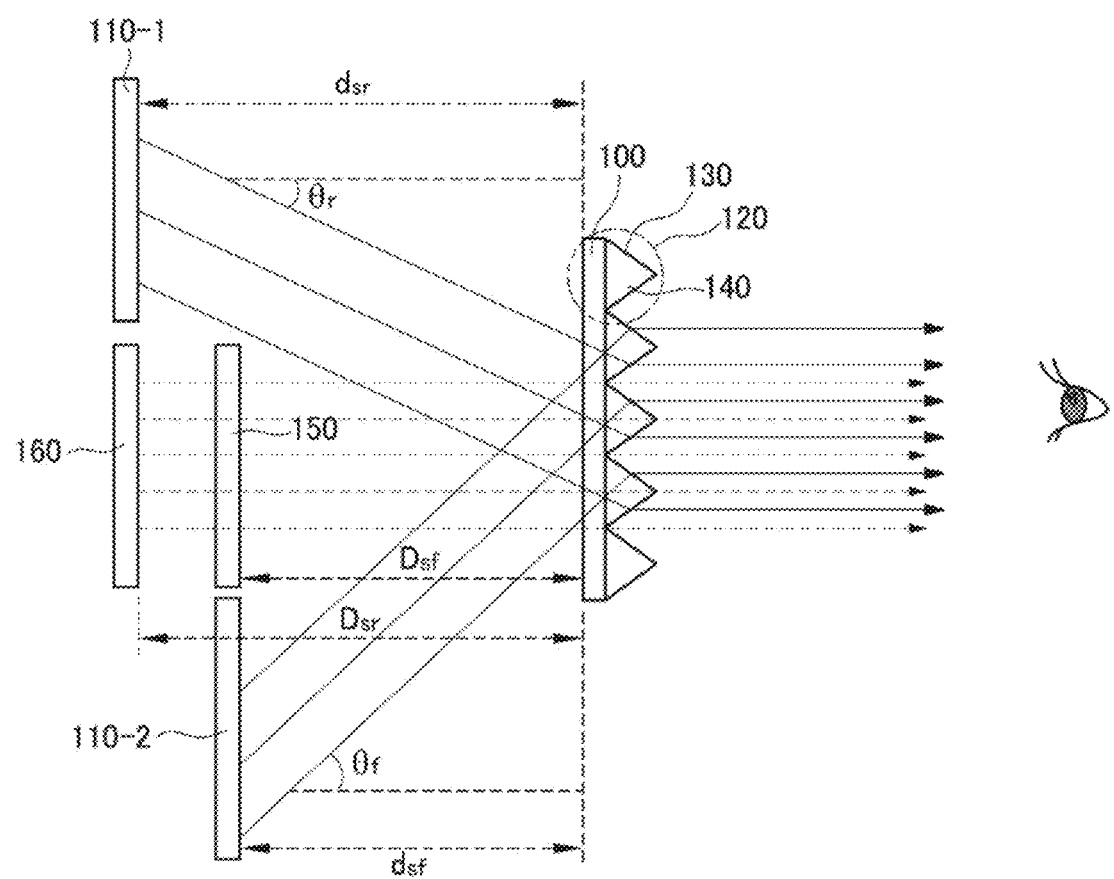
FIG. 1 is an exemplary diagram illustrating a floating hologram apparatus according to an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Through the whole document, a part of an operation or function described as being carried out by a terminal or device may be carried out by a server connected to the terminal or device. Likewise, a part of an operation or function described as being carried out by a server may be carried out by a terminal or device connected to the server.

Hereinafter, an exemplary embodiment of the present disclosure will be described in detail with reference to the accompanying configuration views or process flowcharts.

First Embodiment

FIG. 1 is an exemplary diagram illustrating a floating hologram apparatus according to an exemplary embodiment of the present disclosure. Referring to FIG. 1, a floating hologram apparatus according to a first embodiment may include a prism array 100 configured to refract rays of a first hologram image and a second hologram image, a first display 110-1 configured to output the first hologram image, and a second display 110-2 configured to output the second hologram image.

The prism array 100 is positioned in front of the first display 110-1 and the second display 110-2. In the prism array 100, multiple prisms 120 configured to refract incident rays are arranged.

Figure 4:
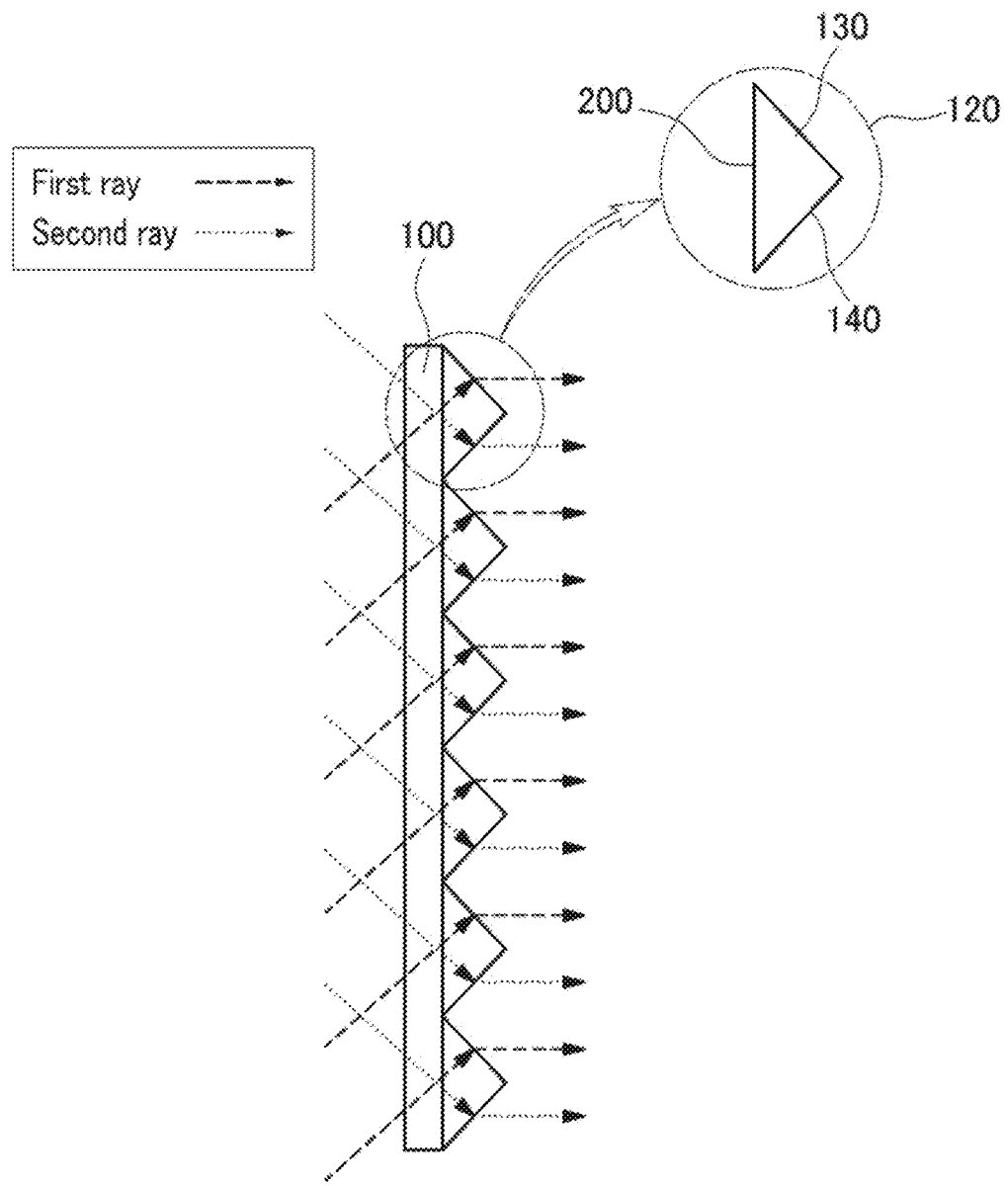
FIG. 4 is an exemplary diagram illustrating a prism array according to an exemplary embodiment of the present disclosure.

In this regard, the detailed configuration of the prism array 100 will be described with reference to FIG. 4. Referring to FIG. 4, the prism array 100 is configured such that the multiple prisms 120 configured to refract a first ray incident in a first direction and a second ray incident in a second direction different from the first direction toward an observer are consecutively arranged.

Each of the multiple prisms 120 may include an incident surface 200 which is an optical plane to which rays are incident, a first facet 130 which is an optical plane configured to refract a first ray incident from below the prism 120, and a second facet 140 which is an optical plane configured to refract a second ray incident in a direction different from the direction of the first ray, i.e., from above the prism 120.

Herein, refracted rays of the first ray and the second ray may proceed parallel to each other when viewed by the observer.

Referring to FIG. 1 again, the first display 110-1 configured to output the first hologram image is distant as much as $d_w$ from the prism array 100. The second display 110-2 configured to output the second hologram image is distant as much as $d_{sf}$ from the prism array 100. Herein, the first hologram image may be a rear image, e.g., a background image. Further, the second hologram image may be a front image, e.g., an object image.

The first display 110-1 may be positioned above the second display 110-2. Further, the first display 110-1 may be positioned behind the second display 110-2.

A ray of the first hologram image output from the first display 110-1 is incident to the prism array 100 with a first incident angle $\theta_r$. The ray of the first hologram image incident to the prism array 100 may be refracted by the second facet 140 of the prism array 100, and, thus, a floating hologram 160 of the first hologram image may be projected onto a first projection position behind the prism array 100.

A ray of the second hologram image output from the second display 110-2 is incident to the prism array 100 with a second incident angle $\theta$. The ray of the second hologram image incident to the prism array 100 may be refracted by the first facet 130 of the prism array 100, and, thus, a floating hologram 150 of the second hologram image may be projected onto a second projection position behind the prism array 100.

Herein, a distance $d_{sr}$ from the prism array 100 to the first projection position and a distance $d_{sf}$ from the prism array 100 to the second projection position can be calculated by the following Equations 1 and 2.

$$D_f = \frac{d_{sf}}{\cos\theta_f} \quad \text{[Equation 1]}$$

$$D_r = \frac{d_{sr}}{\cos\theta_r} \quad \text{[Equation 2]}$$

As such, the ray of the first hologram image output from the first display 110-1 positioned relatively in the back is refracted by the prism array 100 and then proceeds toward the observer and the observer can see the floating hologram 160 (e.g., background image) of the first hologram image projected onto a position distant as much as $D_r$. Further, the ray of the second hologram image output from the second display 110-2 positioned relatively in front is refracted by the prism array 100 and then proceeds toward the observer and the observer can see the floating hologram 150 (e.g., object) of the second hologram image projected onto a position distant as much as $D_f$.

As such, a floating hologram of an object and a floating hologram of a background image can be respectively projected onto different projection positions using the two displays, i.e., the first display 110-1 and the second display 110-2, which are arranged at different positions distant from the prism array 100.

The observer can watch the floating hologram of the object and the floating hologram of the background image with a different sense of depths, respectively.

However, the floating hologram apparatus according to the first embodiment requires the two displays, i.e., the first display 110-1 and the second display 110-2, and the two displays need to be positioned at different depths from each other, which causes an increase in size of the floating hologram apparatus.

Further, in the case where white rays are output from the first display 110-1 and the second display 110-2 and pass through the prism array 100, rays of red, green, and blue components are output in different directions, respectively, due to a difference in refractive index depending on a wavelength. That is, even if a clear image is expressed through the first display 110-1 and the second display 110-2, each color is separated through the prism array 100 and the image is projected on space, which is referred to as chromatic dispersion.

Such chromatic dispersion can be overcome by previously applying inverse distortion to colors of the first hologram image and the second hologram image. That is, if distances from the first display 110-1 and the second display 110-2 to the prism array 100 are determined, the amount of chromatic dispersion becomes uniform in the entire region. Therefore, if pixels are previously shifted and arranged depending on the amount of chromatic dispersion and watched through the prism array 100, a floating hologram free of chromatic dispersion can be seen.

Meanwhile, FIG. 1 illustrates that the first display 110-1 is positioned above the second display 110-2 and also positioned behind the second display 110-2, but may not be limited thereto.

For example, the second display 110-2 may be positioned behind the first display 110-1. In this case, desirably, the first hologram image may be an object image and the second hologram image may be a background image.

Second Embodiment

Figure 2:
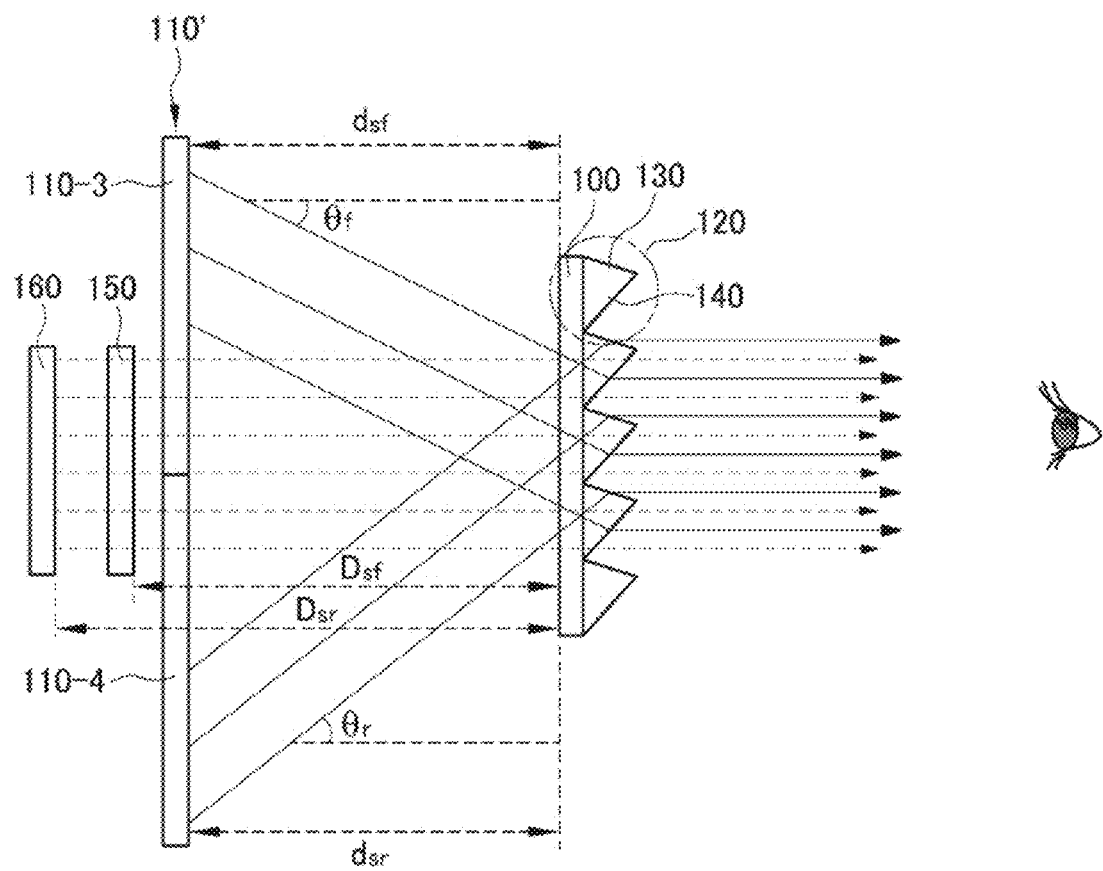
FIG. 2 is an exemplary diagram illustrating a floating hologram apparatus according to another exemplary embodiment of the present disclosure.

FIG. 2 is an exemplary diagram illustrating a floating hologram apparatus according to another exemplary embodiment of the present disclosure. FIG. 2 is provided to solve the problem of the floating hologram apparatus according to the first embodiment, and a floating hologram apparatus according to a second embodiment may include the prism array 100 configured to refract rays of a first hologram image and a second hologram image and a single display 110' configured to output the first hologram image and the second hologram image.

The display 110' may include a first output area 110-3 to output the first hologram image and a second output area 110-4 to output the second hologram image. FIG. 2 illustrates that the first output area 110-3 and the second output area 110-4 are arranged vertically, but may not be limited thereto. For example, the first output area 110-3 and the second output area 110-4 may be arranged horizontally.

In the case where the single display 110' illustrated in FIG. 2 and the prism array 100 including the first facet 130 and the second facet 140 having the same angle as illustrated in FIG. 1 are used, floating holograms of the first hologram image and the second hologram image are projected onto positions equally distant from the prism array 100 according to Equations 1 and 2 (i.e., $D_r$ and $D_f$ are the same distance).

Therefore, in the second embodiment, an angle between the incident surface 200 of the prism array 100 and the first facet 130 is configured to be different from an angle between the incident surface 200 and the second facet 140, and, thus, floating holograms of the first hologram image and the second hologram image can be projected onto different projection positions, respectively.

Figure 5:
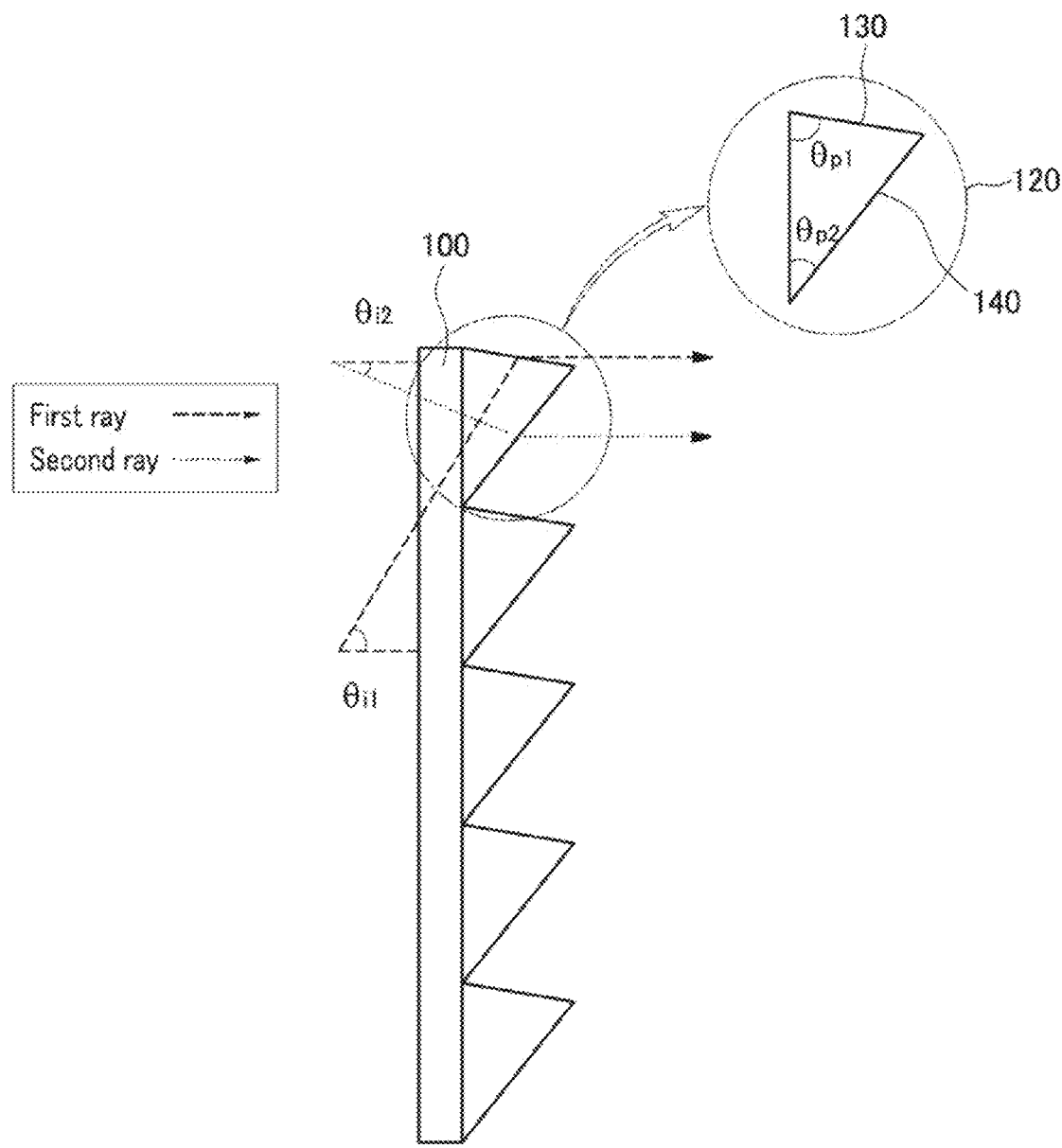
FIG. 5 is an exemplary diagram illustrating a prism array according to another embodiment of the present disclosure.

Referring to FIG. 5, the prism array 100 of the floating hologram apparatus according to the second embodiment may include the multiple prisms 120 of which the first facet 130 and the second facet 140 have different angles.

In general, as an angle between the incident surface 200 and a facet is increased, an incident angle of a ray is increased. For example, if an angle $\theta_{p1}$ between the incident surface 200 and the first facet 130 is greater than an angle $\theta_{p2}$ between the incident surface 200 and the second facet 140 as illustrated in FIG. 4, an incident angle $\theta_{i1}$ of a first ray is greater than an incident angle $\theta_{i2}$ of a second ray.

In this case, a floating hologram of the first ray is projected behind a floating hologram of the second ray according to Equations 1 and 2. Therefore, desirably, a hologram image incident to a facet having a greater angle with the incident surface 200 may serve as a background image and a hologram image incident to a facet having a smaller angle with the incident surface 200 may serve as an object image.

Referring to FIG. 2 again, in the floating hologram apparatus according to the second embodiment, the first facet 130 of the prism array 100 may have an angle which is greater than an angle of the second facet 140.

In this case, desirably, the first hologram image output from the first output area 110-3 may be an object image and the second hologram image output from the second output area 110-4 may be a background image.

As such, a ray of the first hologram image output from the first output area 110-3 is incident to the prism array 100 with a first incident angle $\theta_f$. The ray of the first hologram image incident to the prism array 100 may be refracted by the second facet 140 of the prism array 100, and, thus, a floating hologram 150 of the first hologram image may be projected onto a first projection position behind the prism array 100.

A ray of the second hologram image output from the second output area 110-4 is incident to the prism array 100 with a second incident angle $\theta_r$. The ray of the second hologram image incident to the prism array 100 may be refracted by the first facet 130 of the prism array 100, and, thus, a floating hologram 160 of the second hologram image may be projected onto a second projection position behind the prism array 100.

In this case, since the angle $\theta_{p1}$ of the first facet 130 is greater than the angle $\theta_{p2}$ of the second facet 140, the incident angle $\theta_r$ of the ray of the second hologram image may be greater than the incident angle $\theta_f$ of the ray of the first hologram image. Thus, the ray of the first hologram image output from the first output area 110-3 is refracted by the prism array 100 and then proceeds toward the observer and the observer can see the floating hologram 150 (e.g., object) of the first hologram image projected onto a position distant as much as $d_{sf}$. Further, the ray of the second hologram image output from the second output area 110-4 is refracted by the prism array 100 and then proceeds toward the observer and the observer can see the floating hologram 160 (e.g., background) of the second hologram image projected onto a position distant as much as $d_{sr}$.

According to the second embodiment, the problem of the increase in size of the floating hologram apparatus according to the first embodiment can be solved using the single display 110'. Further, since the single display 110' is used and the angle between the incident surface 200 of the prism array 100 and the first facet 130 is configured to be different from the angle between the incident surface 200 and the second facet 140, floating holograms of the first hologram image and the second hologram image can be projected onto different projection positions, respectively.

Third Embodiment

Figure 3:
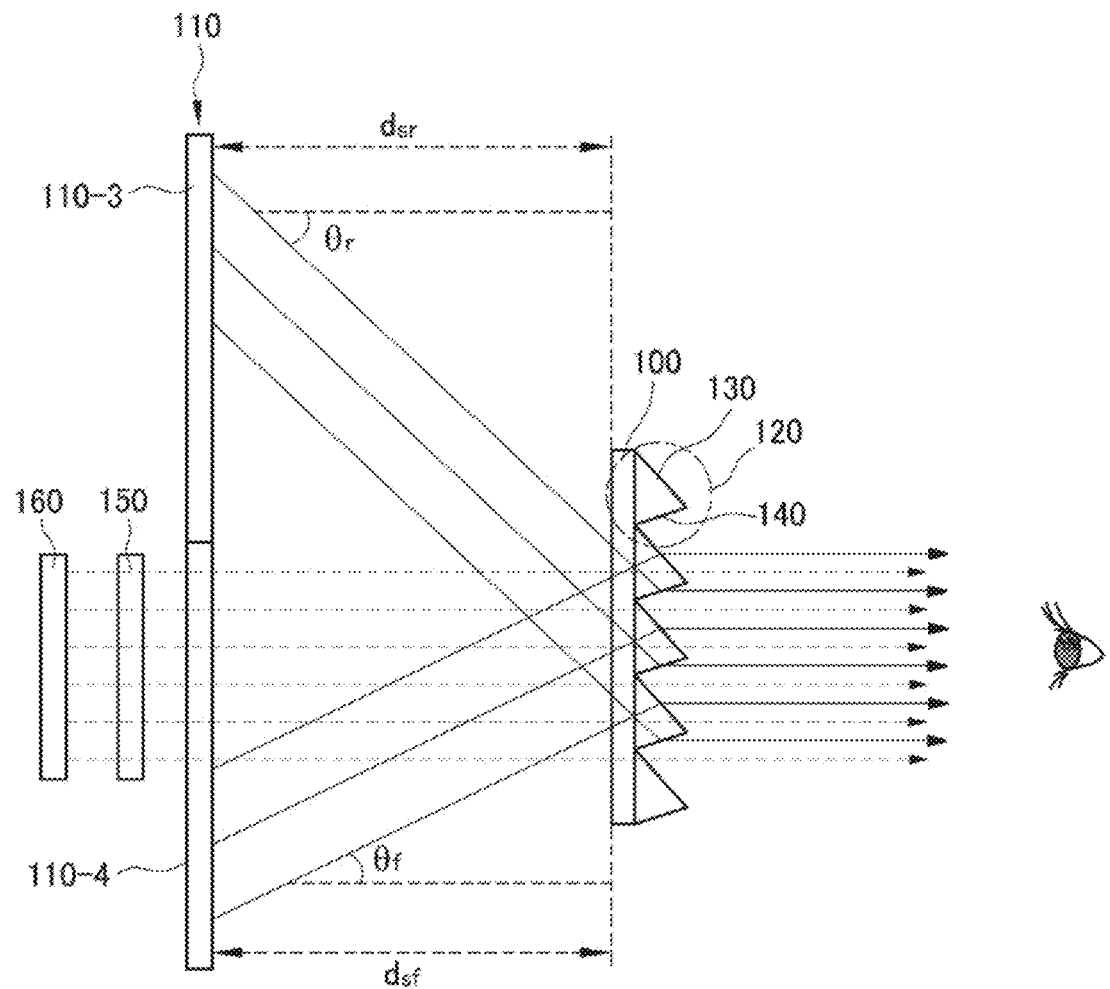
FIG. 3 is an exemplary diagram illustrating a floating hologram apparatus according to another exemplary embodiment of the present disclosure.

FIG. 3 is an exemplary diagram illustrating a prism array according to another exemplary embodiment of the present disclosure. A floating hologram apparatus according to a third embodiment may include the prism array 100 configured to refract rays of a first hologram image and a second hologram image and the single display 110' configured to output the first hologram image and the second hologram image like the floating hologram apparatus according to the second embodiment.

In the prism array 100 of the floating hologram apparatus according to the third embodiment, the second facet 140 has an angle which is greater than an angle of the first facet 130.

In this case, desirably, the first hologram image output from the first output area 110-3 may be a background image and the second hologram output from the second output area 110-4 may be an object image.

Meanwhile, the floating hologram apparatus according to the first embodiment may have a different configuration. That is, referring to FIG. 1, the floating hologram apparatus according to the first embodiment may also be configured including the prism array 100 of which the first facet 130 and the second facet 140 have different angles. In this case, the first display 110-1 and the second display 110-2 may be equally distant from the prism array 100.

For example, the first facet 130 may have an angle which is greater than an angle of the second facet 140. In this case, desirably, the first hologram image may be an object image and the second hologram image may be a background image.

For another example, the second facet 140 may have an angle which is greater than an angle of the first facet 130. In this case, desirably, the first hologram image may be a background image and the second hologram image may be an object image.

Accordingly, even if two displays are used, the size of the floating hologram apparatus can be reduced by arranging the two displays at the same position.

Figure 6A:
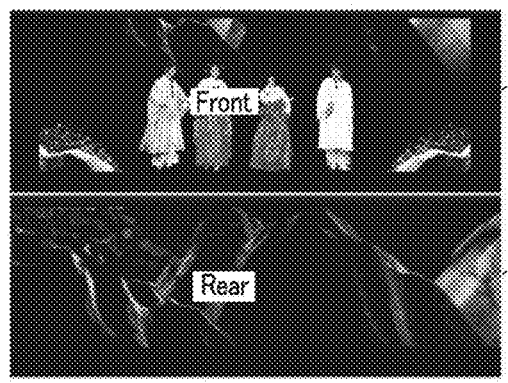
FIGS. 6A-6E are diagrams illustrating displays and output images according to exemplary embodiments of the present disclosure.

FIGS. 6A-6E are diagrams illustrating displays and output images according to exemplary embodiments of the present disclosure. FIG. 6A illustrates that a first hologram image (object image) is output from the first output area 110-3 and a second hologram image (background image) is output from the second output area 110-4.

Figure 6B:

Referring to FIG. 6B, it can be seen that the first hologram image and the second hologram image are incident to the prism in different directions, respectively, and thus chromatic dispersion compensated in opposite directions. For example, in the first hologram image, a blue part faces upward and a red part faces downward and in the second hologram image, a blue part faces downward and a red part faces upward.

Figure 6C:

Referring to FIG. 6C, it can be seen that if the first facet 130 and the second facet 140 of the prism array 100 have the same angle, a floating hologram of the first hologram image and a floating hologram of the second hologram image are seen as overlapped.

Figure 6D:
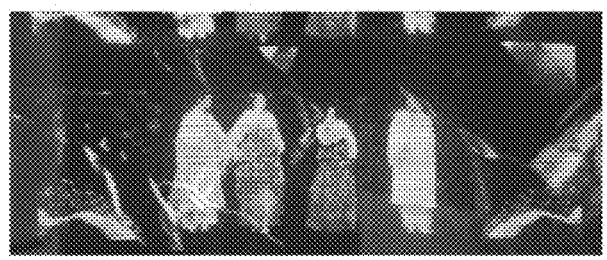

Referring to FIG. 6D, it can be seen that if the first facet 130 of the prism array 100 has an angle which is greater than an angle of the second facet 140 (second embodiment), a floating hologram of the first hologram image is positioned in front of a floating hologram of the second hologram image.

Figure 6E:
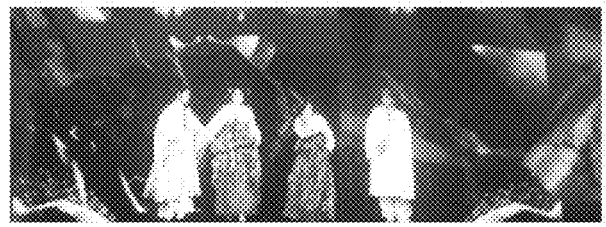

Referring to FIG. 6E, it can be seen that if the second facet 140 of the prism array 100 has an angle which is greater than an angle of the first facet 130 (third embodiment), a floating hologram of the second hologram image is positioned in front of a floating hologram of the first hologram image.

Referring to the floating hologram images in FIG. 6C to FIG. 6E, it can be seen that the floating hologram (object image) of the first hologram image is seen as overlapped on the floating hologram (background image) of the second hologram image in a certain range (mainly in the vicinity of the center of the image). Since the two images are present on the single display 110' and a distance between the two images is small, this problem occurs when the floating hologram apparatus is viewed from below or above or from a close distance. Therefore, in the following embodiments, methods capable of solving this problem will be suggested.

Fourth Embodiment

Figure 7:
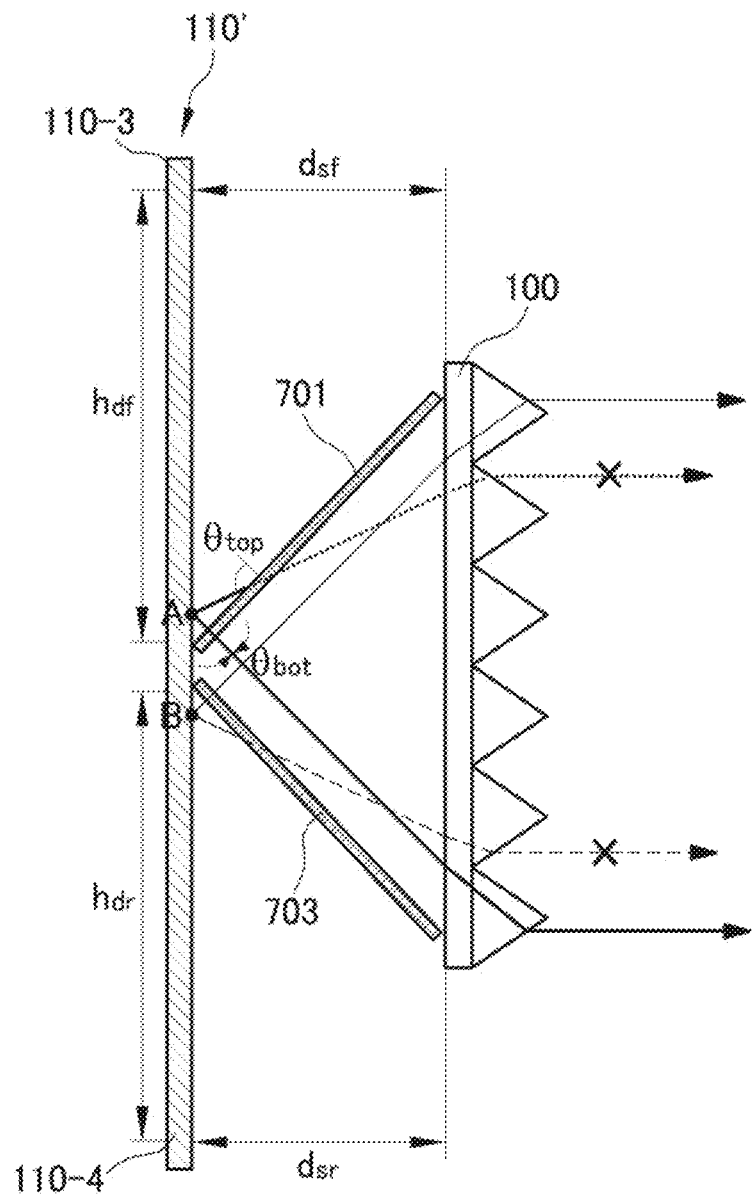
FIG. 7 is an exemplary diagram illustrating a floating hologram apparatus according to yet another exemplary embodiment of the present disclosure.

FIG. 7 is an exemplary diagram illustrating a floating hologram apparatus according to yet another exemplary embodiment of the present disclosure. Referring to FIG. 7, a ray output from a point A of the display 110' is incident toward a lower part of the prism array 100 as a first hologram image and refracted by the prism array 100 and then proceeds toward the observer. A ray output from a point B of the display 110' is incident toward an upper part of the prism array 100 as a second hologram image and refracted by the prism array 100 and then proceeds toward the observer. In this case, the observer may see the two hologram images as projected at different depths depending on a position of the observer due to a path difference between the two rays.

That is, each of the first hologram image and the second hologram image proceeds in a specific direction and is refracted by the prism array 100 and then proceeds toward the observer. However, in the general display 110', an image is output from one point of the display 110' at an angle of about 180° in order to secure a viewing angle. Therefore, some of rays output in other directions except the output directions of the first hologram image and the second hologram image may proceed toward the observer through the prism array 100. That is, the observer may see an unwanted image that becomes noise of the image.

A floating hologram apparatus according to a fourth embodiment may include the display 110', the prism array 100, and filters 701 and 703 for controlling a field of view positioned between the display 110' and the prism array 100.

The display 110' may include the first output area 110-3 configured to output a first hologram image and the second output area 110-4 configured to output a second hologram image.

The prism array 100 may include the multiple prisms 120 of which the first facet 130 and the second facet 140 have different angles (see FIG. 1).

All the descriptions about the display 110' and the prism array 100 in the first embodiment to the third embodiment can be applied to the floating hologram apparatus according to the fourth embodiment.

Figure 8A:
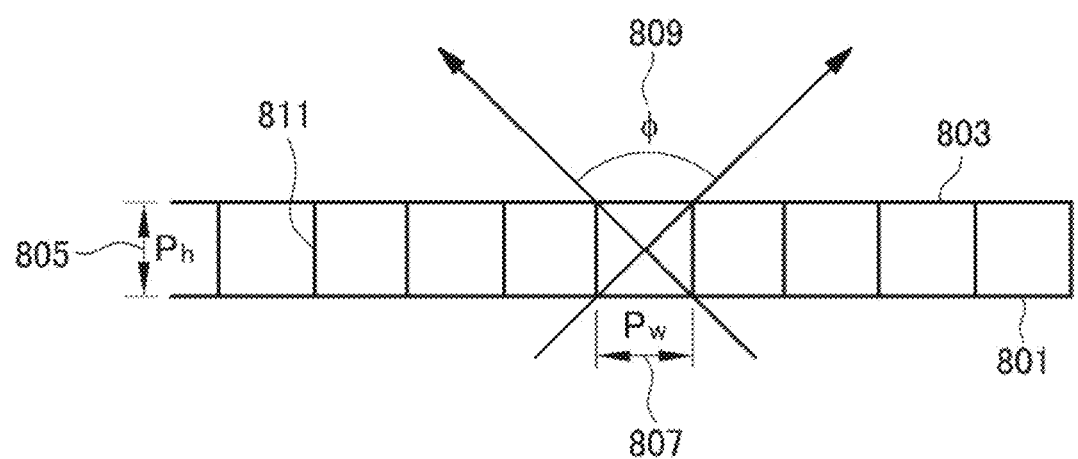

The filters for controlling a field of view 701 and 703 will be described in detail with reference to FIG. 8A and FIG. 8B (shown collectively as FIGS. 8B(1) to 8B(5)). Referring to FIG. 8A, the filters for controlling a field of view 701 and 703 may include a bottom surface 801, a top surface 803, and multiple barriers 811 which are positioned between the bottom surface 801 and the top surface 803 and extended in a transverse direction when the observer watches the floating hologram apparatus.

The multiple barriers 811 are protruded from the bottom surface 801 toward the top surface 803 and may be arranged with space therebetween along a longitudinal direction when the observer watches the floating hologram apparatus.

If a height 805 of the multiple barriers 811 is $P_h$ and a distance 807 between the multiple barriers 811 is $P_w$, an angle 809 in which the rays pass the filters for controlling a field of view 701 and 703 is as shown in the following Equation 3.

$$\phi = 2\tan^{-1}\frac{P_w}{P_h}$$ [Equation 3]

Referring to FIG. 8B (shown collectively as FIGS. 8B(1) to 8B(5)), an angle in which the rays can be passed and an angle in which the rays can be blocked can be controlled by adjusting the height 805 and the distance 807 of the multiple barriers 811. For example, in FIG. 8B(3), a reference numeral 813 denotes a first arrangement of the barriers 811 which allows only the rays within a specific angle to pass through, and, thus, a stereoscopic image can be seen only from a specific direction.

Further, in FIG. 8B(1), a reference numeral 815 denotes a second arrangement of the barriers 811 in which the barriers 811 are set to have a relatively great height, and, thus, an angle in which the rays can be passed can be controlled to be narrow.

Furthermore, in FIG. 8B(5), a reference numeral 817 denotes a third arrangement of the barriers 811 in which the barriers 811 are set to have a small height, and, thus, an angle in which the rays can be passed can be controlled to be wide. Moreover, as indicated by reference numerals 819 and 821 in FIG. 8(B)(2) and FIG. 8(B)(4), the multiple barriers 811 may be set to have a great or small distance therebetween, and, thus, an angle in which the rays can be passed can be controlled to be wide or narrow.

Referring to FIG. 7 again, in the floating hologram apparatus according to the fourth embodiment, the filters for controlling a field of view 701 and 703 are arranged between the display 110' and the prism array 100. For example, the filters for controlling a field of view 701 and 703 may include a first filter for controlling a field of view 701 that blocks a ray incident at an angle within a first range among rays of the first hologram image output from the first output area 110-3 and a second filter for controlling a field of view 703 that blocks a ray incident at an angle within a second range among rays of the second hologram image output from the second output area 110-4.

In this case, the first filter for controlling a field of view 701 and the second filter for controlling a field of view 703 are provided slantly at a predetermined angle between the display 110' and the prism array 100. For example, the first filter for controlling a field of view 701 is provided such that its upper part is slanted toward the prism array 100 and the second filter for controlling a field of view 701 is provided such that its lower part is slanted toward the prism array 100.

In the filters for controlling a field of view 701 and 703, a predetermined angle to block the rays can be changed by adjusting at least one of the height and the distance of the multiple barriers 711. For example, in the case where a first ray incident to the first filter for controlling a field of view 701 in a first direction is incident to the prism array 100 and refracted by the prism array 100, a first stereoscopic image is generated behind the prism array 100, but a second ray incident to the first filter for controlling a field of view 701 in a second direction is blocked by the first filter for controlling a field of view 701, and, thus, a second stereoscopic image is not generated behind the prism array 100.

For example, an upward ray among rays output in various directions from the point A of the display 110' is incident to the first filter for controlling a field of view 701 at an angle of $\theta_{top}$ and blocked by the first filter for controlling a field of view 701. On the other hand, a downward ray among the rays output in various directions from the point A is incident to the first filter for controlling a field of view 701 at an angle of $\theta_{bot}$ and passes through the first filter for controlling a field of view 701 and a stereoscopic image is generated behind the prism array 100.

On the contrary, the second filter for controlling a field of view 703 may block the first ray incident in the first direction and allow the second ray incident in the second direction to pass through.

Therefore, since the filters for controlling a field of view 701 and 703 are provided slantly at a predetermined angle between the display 110' and the prism array 100, the pass angle 809 can be appropriately controlled. Therefore, the first filter for controlling a field of view 701 can block a ray which towards an upper part and the second filter for controlling a field of view 703 can block a ray which towards an lower part.

Thus, a large stereoscopic image can be seen in a wide field of view without any overlap between stereoscopic images. In this case, if an angle in which the rays pass is too small, angles of the rays incident to the prism array 100 become small, which results in a decrease of a vertical field of view of the entire system. Therefore, a pass angle for the filters for controlling a field of view 701 and 703 needs to be adjusted appropriately for characteristics of the system.

Fifth Embodiment

In the floating hologram apparatus according to the fourth embodiment, the filters for controlling a field of view 701 and 703 are provided slantly between the display 110' and the prism array 100, and, thus, a distance is formed between the display 110' and the filters for controlling a field of view 701 and 703 and may cause deterioration in image quality.

A fifth embodiment is provided to solve the deterioration in image quality.

Figure 9:
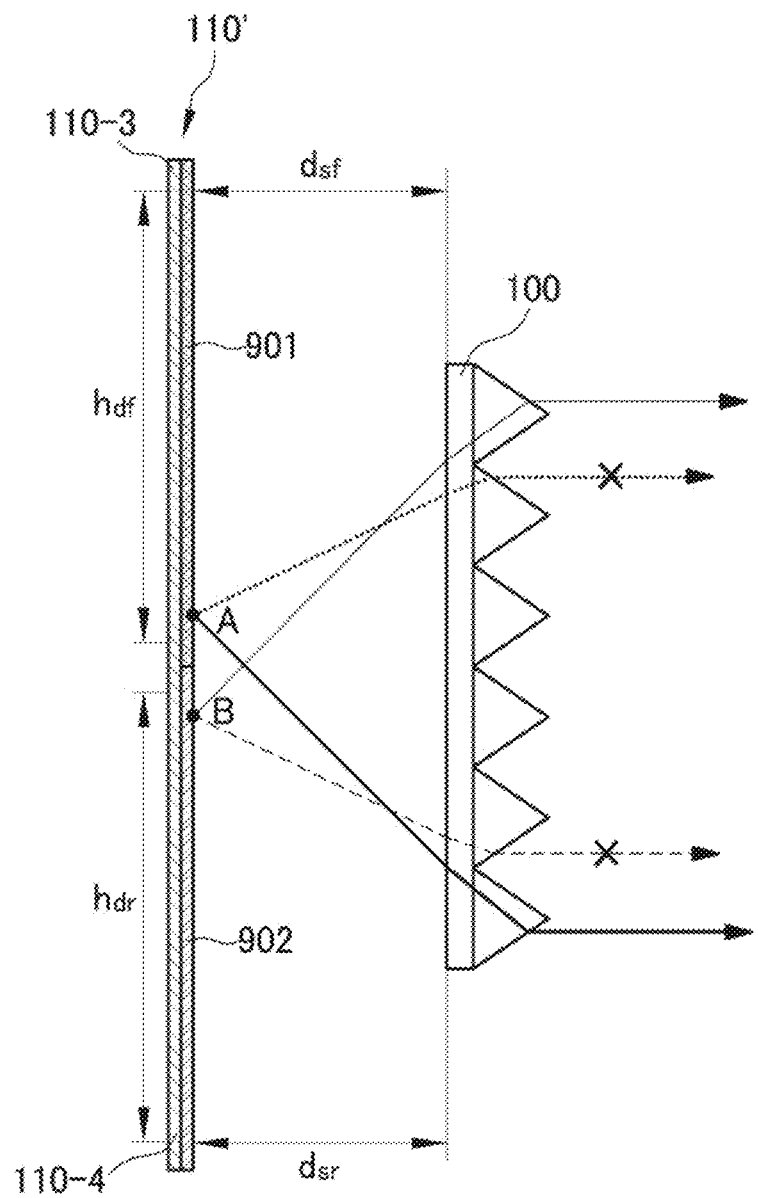
FIG. 9 is an exemplary diagram illustrating a floating hologram apparatus according to still another exemplary embodiment of the present disclosure.

FIG. 9 is an exemplary diagram illustrating a floating hologram apparatus according to still another exemplary embodiment of the present disclosure. Referring to FIG. 9, a floating hologram apparatus according to the fifth embodiment may include the display 110', the prism array 100, and filters for controlling a field of view 901 and 902.

The display 110' may include the first output area 110-3 configured to output the first hologram image and the second output area 110-4 configured to output the second hologram image.

The prism array 100 may include the multiple prisms 120 of which the first facet 130 and the second facet 140 have different angles (see FIG. 1).

All the descriptions about the display 110' and the prism array 100 in the first embodiment to the third embodiment can be applied to the floating hologram apparatus according to the fifth embodiment.

The filters for controlling a field of view 901 and 902 are attached to the front of the display 110'. The filters for controlling a field of view 901 and 902 may include a first filter for controlling a field of view 901 that blocks a ray incident at an angle within a first range among rays of the first hologram image output from the first output area 110-3 and a second filter for controlling a field of view 902 that blocks a ray incident at an angle within a second range among rays of the second hologram image output from the second output area 110-4.

The first filter for controlling a field of view 901 may be attached to the first output area 110-3 and the second filter for controlling a field of view 903 may be attached to the second output area 110-4.

Figure 10:
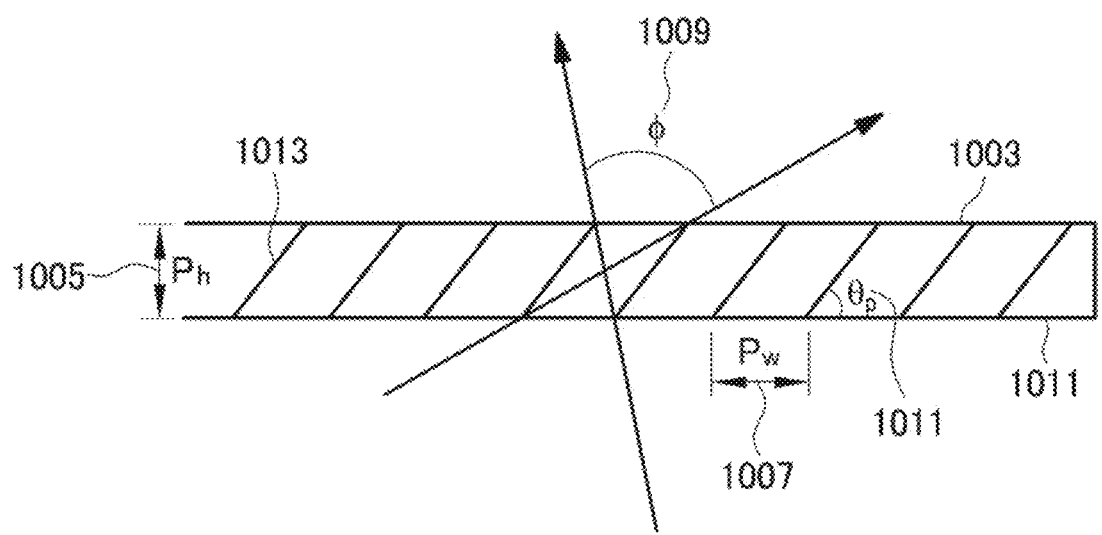
FIG. 10 is a diagram illustrating a filter for controlling a field of view according to another embodiment of the present disclosure.

The filters for controlling a field of view 901 and 902 according to the fifth embodiment will be described with reference to FIG. 10. Referring to FIG. 10, the filters for controlling a field of view 901 and 902 may include a bottom surface 1001, a top surface 1003, and multiple barriers 1013 which are positioned between the bottom surface 1001 and the top surface 1003 and extended in a transverse direction when the observer watches the floating hologram apparatus. The multiple barriers 1013 are protruded slantly at a predetermined angle $\theta_P$ and may be arranged with space therebetween along a longitudinal direction when the observer watches the floating hologram apparatus.

Since the multiple barriers 1013 are arranged as slanted, only the rays approximately parallel to the respective barriers 1013 can pass through the filters for controlling a field of view 901 and 902.

If a distance 1007 between the multiple barriers 1013 is $P_w$ and a height 1005 of the multiple barriers 1013 is $P_h$ and a slant angle 1011 of the barriers 1013 is $\theta_P$, an angle 809 in which the rays pass the filters for controlling a field of view 901 and 902 is as shown in the following Equation 4.

$$\phi = 180 - \tan^{-1}\frac{P_h}{P_w + (p_h/\tan\theta_p)} + \tan^{-1}\frac{P_h}{P_w - (p_h/\tan\theta_p)} \quad \text{[Equation 4]}$$

Therefore, an output direction and a pass angle of the rays can be controlled by adjusting the height, the distance, and the angle (the degree of slant of the barriers 1013) of the multiple barriers 1013.

The filters for controlling a field of view 901 and 902 may be configured to control a predetermined angle in which the rays can be blocked by the filters for controlling a field of view 901 and 902 by changing at least one of the height, the distance, and the angle of the multiple barriers 1013.

Referring to FIG. 9 again, the multiple barriers 1013 of the first filter for controlling a field of view 901 are configured to be slanted toward a lower part of the display 110'. A first ray incident in a first direction (upward direction) among rays output from the point A of the first output area 110-3 cannot pass through the first filter for controlling a field of view 901 and thus is blocked, and a second ray incident in a second direction (downward direction) among the rays output from the point A can pass through the first filter for controlling a field of view 901.

The multiple barriers 1013 of the second filter for controlling a field of view 902 are configured to be slanted toward an upper part of the display 110'. A first ray incident in a first direction (upward direction) among rays output from the point B of the second output area 110-4 can pass through the second filter for controlling a field of view 902, and a second ray incident in a second direction (downward direction) among the rays output from the point B cannot pass through the second filter for controlling a field of view 902 and thus is blocked.

Therefore, only the ray which towards a lower part among the rays output from the first output area 110-3 of the display 110' can be passed and only the ray which towards a upper part among the rays output from the second output area 110-4 of the display 110' can be passed and proceed toward the observer.

An image can be seen as projected on space corresponding to a distance depending on a path difference between two rays. Thus, a large space image can be seen in a wide field of view without any image noise. In this case, if a pass angle of rays is too small, angles of the rays incident to the prism array 100 become small, which results in a decrease of a vertical field of view of the floating hologram apparatus. Therefore, a pass angle for the filters for controlling a field of view 901 and 902 needs to be adjusted appropriately for characteristics of the floating hologram apparatus.

Sixth Embodiment

Figure 11:
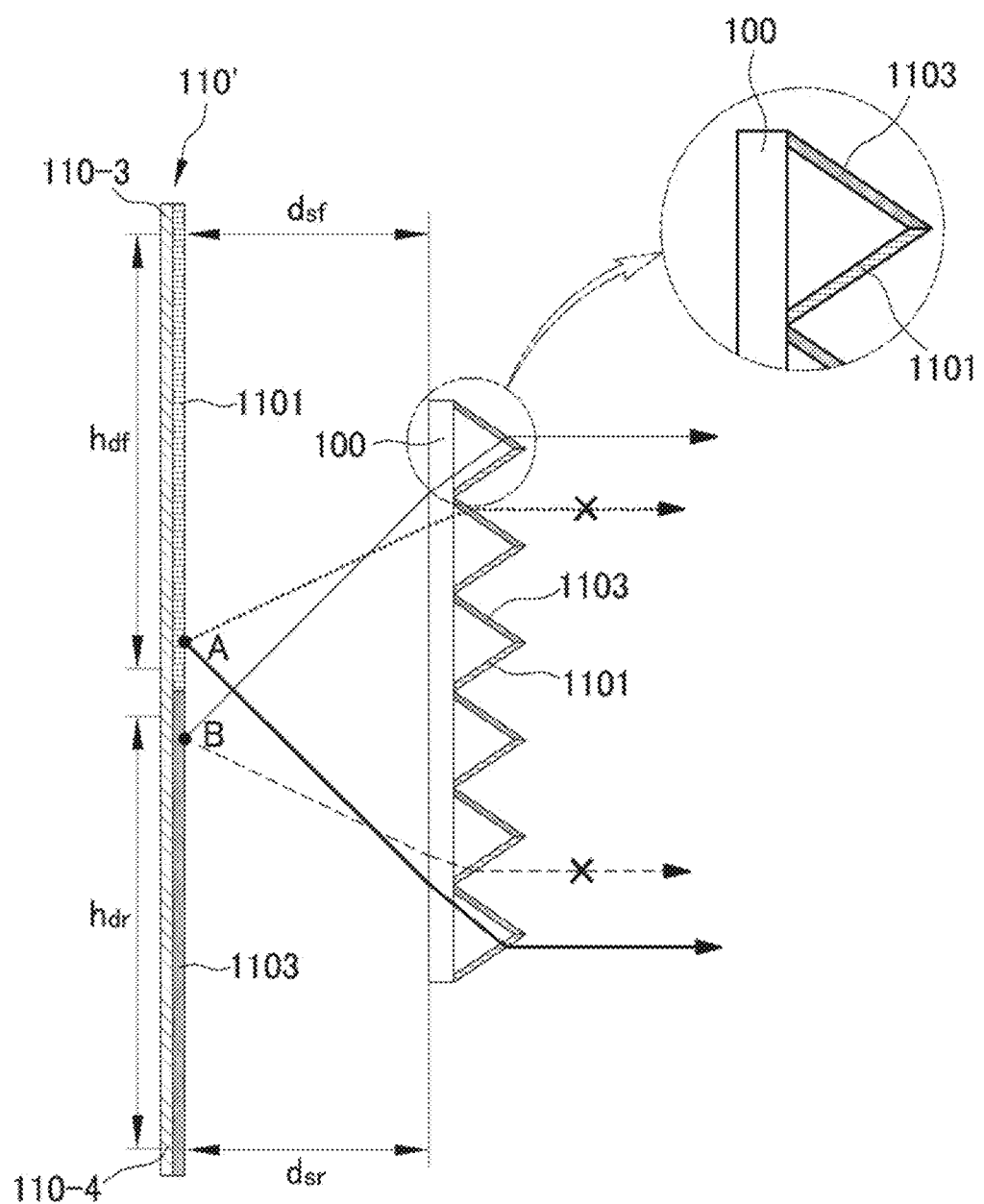
FIG. 11 is an exemplary diagram illustrating a floating hologram apparatus according to still another exemplary embodiment of the present disclosure.

FIG. 11 is an exemplary diagram illustrating a floating hologram apparatus according to still another exemplary embodiment of the present disclosure. Referring to FIG. 11, a floating hologram apparatus according to a sixth embodiment may include the display 110' and the prism array 100.

The display 110' may include the first output area 110-3 configured to output the first hologram image and the second output area 110-4 configured to output the second hologram image.

The prism array 100 may include the multiple prisms 120 of which the first facet 130 and the second facet 140 have different angles (see FIG. 1).

All the descriptions about the display 110' and the prism array 100 in the first embodiment to the third embodiment can be applied to the floating hologram apparatus according to the sixth embodiment.

A first-type polarizing film 1101 may be attached to the first output area 110-3 of the display 110' and a second-type polarizing film 1103 may be attached to the second output area 110-4. Herein, the first-type polarizing film 1101 and the second-type polarizing film 1103 may have polarized light property orthogonal to each other. For example, the first-type polarizing film 1101 may have vertical polarized light property, and the second-type polarizing film 1103 may have horizontal polarized light property.

Otherwise, linearly polarized rays having angles orthogonal to each other may be used. Alternatively, a left circularly polarized ray and a right circularly polarized ray may be used using a quarter-wave plate with a circular polarizing filter or a linear polarizing filter at the same time.

The second-type polarizing film 1103 may be attached to the first facet 130 of the prism array 100 and the first-type polarizing film 1101 may be attached to the second facet 140.

Therefore, rays of the first hologram image output from the first output area 110-3 may have the same polarized light property as the first-type polarizing film 1101 attached to the second facet 140 of the prism array 100. Further, rays of the second hologram image output from the second output area 110-4 may have the same polarized light property as the second-type polarizing film 1103 attached to the first facet 130 of the prism array 100.

Therefore, the first hologram image output from the first output area 110-3 of the display 110' can be seen by the observer only through the second facet 140 of each prism of the prism array 100. Meanwhile, the second hologram image output from the second output area 110-4 of the display 110' can be seen by the observer only through the first facet 130 of each prism of the prism array 100.

In the floating hologram apparatus using polarized light property according to the sixth embodiment, the polarized light property of the display 110' needs to be considered in order to improve the light efficiency. If the display 110' does not have polarized light property, the polarizing films 1101 and 1103 crossing to each other may be attached to the front of the display 110' and the polarizing films 1101 and 1103 crossing to each other may also be attached to the prism array 100.

If the display 110' already has polarized light property, it is desirable to use its polarized light property in order not to reduce the light efficiency. That is, if the display 110' has linear polarized light property in a specific direction, a polarizing film may not be attached to the first output area 110-3 of the display 110' and a third-type polarizing film capable of rotating and changing the linear polarized light of the display 110' in a specific direction may be attached to the second facet 140 of the prism array 100.

A half wave plate may be attached to the second output area 110-4 of the display 110' to turn a polarized light direction to 90° and a fourth-type polarizing film corresponding thereto may be attached to the first facet 130 of the prism array 100.

Further, according to polarized light property, a quarter wave plate may be arranged in front of the display 110' to show a left circularly polarized light and a right circularly polarized light, and a left circularly polarizing film and a right circularly polarizing film may be further attached to each prism surface of the prism array 100.

If the display 110' has circular polarized light property, the above descriptions may be applied after changing the circular polarized light to linear polarized light or reversing the direction of the circular polarized light. Further, the polarizing film attached to the prism array 100 may be attached to the back of the prism array 100, i.e., a surface facing the display 110', to separate the first hologram image and the second hologram image. Further, multiplexing using a liquid crystal or the like can also be employed for changing polarized light.

Seventh Embodiment

Figure 12:
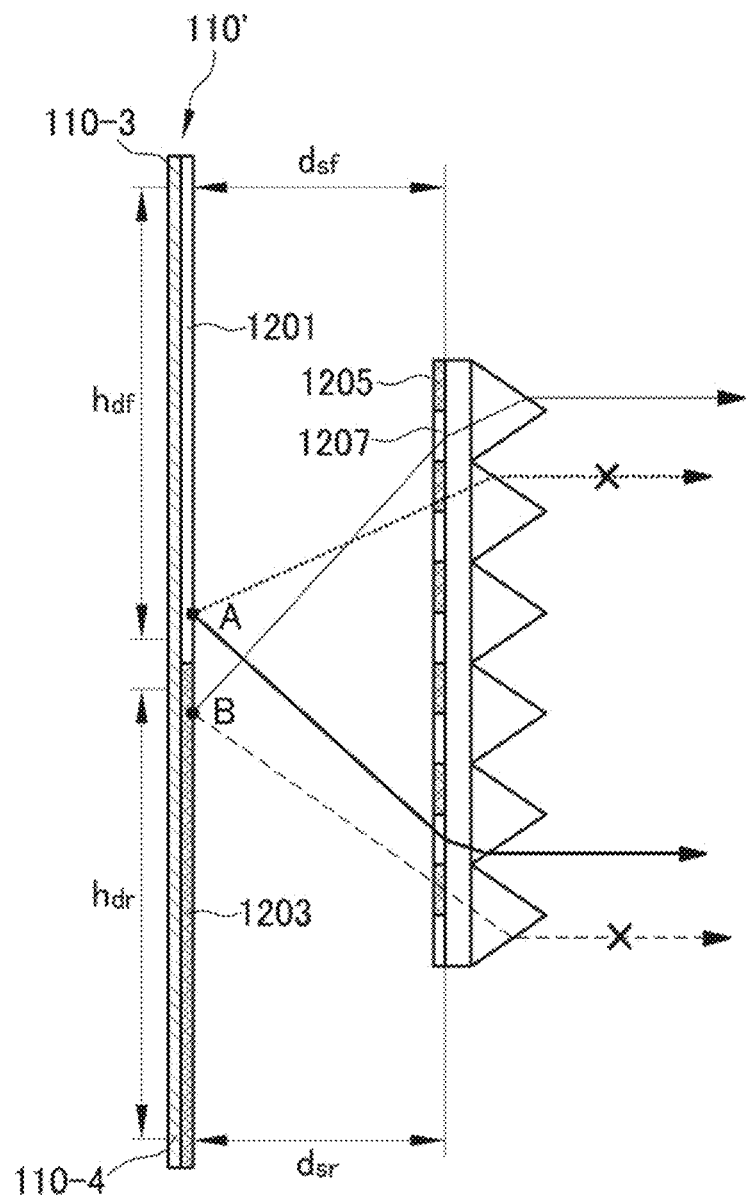
FIG. 12 is an exemplary diagram illustrating a floating hologram apparatus according to still another exemplary embodiment of the present disclosure.

FIG. 12 is an exemplary diagram illustrating a floating hologram apparatus according to still another exemplary embodiment of the present disclosure. A floating hologram apparatus according to a seventh embodiment may include the display 110' and the prism array 100.

The display 110' may include the first output area 110-3 configured to output the first hologram image and the second output area 110-4 configured to output the second hologram image.

The prism array 100 may include the multiple prisms 120 of which the first facet 130 and the second facet 140 have different angles (see FIG. 1).

All the descriptions about the display 110' and the prism array 100 in the first embodiment to the third embodiment can be applied to the floating hologram apparatus according to the seventh embodiment.

The display 110' includes a first input shutter 1201 attached to the front of the first output area 110-3 and a second input shutter 1203 attached to the front of the second output area 110-4. The prism array 100 includes a first output shutter 1205 attached to an upper part of each prism and a second output shutter 1207 attached to a lower part of each prism. The first output shutter 1205 and the second output shutter 1207 of the prism array may be provided on the front of the prism array 100.

The first input shutter 1201 and the second input shutter 1203 are turned on/off alternately. Further, the first output shutter 1205 and the second output shutter 1207 are also turned on/off alternately.

The first input shutter 1201, the second input shutter 1203, the first output shutter 1205, and the second output shutter 1207 may be synchronized with each other according to predetermined rules.

For example, the first input shutter 1201 and the second output shutter 1207 may be turned on simultaneously and the second input shutter 1203 and the first output shutter 1205 may be turned off during a first cycle. In this case, the first hologram image output from the first output area 110-3 of the display 110' passes only through the second facet 140 of each prism and is refracted toward the observer.

During a second cycle, the second input shutter 1203 and the first output shutter 1205 may be turned on simultaneously and the first input shutter 1201 and the second output shutter 1207 may be turned off. In this case, the second hologram image output from the second output area 110-4 of the display 110' passes only through the first facet 130 of each prism and is refracted toward the observer.

If turning on/off of the shutters during the first cycle and the second cycle are performed at 60 frames per second (30 frames each) or higher frames per second, the first hologram image can be provided with the second hologram image to the observer without the flicker of image.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A floating hologram apparatus, comprising:
   a display including a first output area to output a first hologram image and a second output area to output a second hologram image;
   a prism array, in front of the display, to refract rays of the first hologram image and the second hologram image;
   a first filter, between the display and the prism array, to control a field of view by passing a part of rays of the first hologram image and blocking a remaining part of rays of the first hologram image; and
   a second filter, between the display and the prism array, to control a field of view by passing a part of rays of the second hologram image and blocking a remaining part of rays of the second hologram image,
   wherein the prism array includes multiple prisms consecutively arranged,
   wherein each of the multiple prisms includes an incident surface, a first facet to which a ray of the second hologram image is incident, and a second facet to which a ray of the first hologram image is incident,
   wherein a first angle between the incident surface and the first facet is different from a second angle between the incident surface and the second facet,
   wherein both the first filter and the second filter respectively have a bottom surface, a top surface, and multiple barriers that are positioned between the bottom surface and the top surface and arranged with space therebetween, and
   wherein the first filter and the second filter each overlap with the display and the prism array when viewed from a direction perpendicular to the prism array,
   wherein the first filter is slanted from the display toward the prism array to control a pass angle of the rays of the first hologram image by the multiple barriers and the second filter is slanted from the display toward the prism array to control a pass angle of the rays of the second hologram image by the multiple barriers.

2. The floating hologram apparatus of claim 1, wherein a projection position for a floating hologram of the first hologram image and a projection position for a floating hologram of the second hologram image are changed, respectively, depending on a difference between the first angle and the second angle.

3. The floating hologram apparatus of claim 1, wherein the first filter is attached to the front of the first output area and the second filter is attached to the front of the second output area.

4. The floating hologram apparatus of claim 1, wherein the first hologram image is an object image and the second hologram image is a background image.

5. The floating hologram apparatus of claim 4, wherein the first angle is greater than the second angle.

6. The floating hologram apparatus of claim 1, wherein the first hologram image is a background image and the second hologram image is an object image.

7. The floating hologram apparatus of claim 6, wherein the first angle is greater than the second angle.

8. The floating hologram apparatus of claim 1, wherein a first-type polarizing film is attached to the first output area and a second-type polarizing film having polarized light property orthogonal to the first-type polarizing film is attached to the second output area.

9. The floating hologram apparatus of claim 8, wherein the second-type polarizing film is further attached to the first facet and the first-type polarizing film is further attached to the second facet.

10. The floating hologram apparatus of claim 1,
    wherein an input shutter to be turned on or off is attached to the display, and
    an output shutter to be turned on or off is attached to the prism array.

11. The floating hologram apparatus of claim 10,
wherein a first input shutter of the input shutter is attached to the first output area, a second input shutter of the input shutter is attached to the second output area, and
a first output shutter of the output shutter is attached to an upper part of each of the prisms, and a second output shutter of the output shutter is attached to a lower part of each of the prisms.

12. The floating hologram apparatus of claim 11, wherein the first input shutter and the second output shutter are turned on while the second input shutter and the first output shutter are turned off during a first cycle.

13. The floating hologram apparatus of claim 12, wherein the first input shutter and the second output shutter are turned off while the second input shutter and the first output shutter are turned on during a second cycle different from the first cycle.

14. A floating hologram apparatus comprising:
a first display configured to output a first hologram image;
a second display configured to output a second hologram image;
a prism array configured to refract rays of the first hologram image and the second hologram image;
a first filter, between the first display and the prism array, to control a field of view by passing a part of rays of the first hologram image and blocking a remaining part of rays of the first hologram image; and
a second filter, between the second display and the prism array, to control a field of view by passing a part of rays of the second hologram image and blocking a remaining part of rays of the second hologram image,
wherein the prism array includes multiple prisms consecutively arranged,
each of the multiple prisms respectively includes an incident surface, a first facet to which a ray of the second hologram image is incident and a second facet to which a ray of the first hologram image is incident, and
a first angle between the incident surface and the first facet is different from a second angle between the incident surface and the second facet,
both the first filter and the second filter respectively have a bottom surface, a top surface, and multiple barriers which are positioned between the bottom surface and the top surface and arranged with space therebetween, and
wherein the first filter and the second filter each overlap with the first and second displays and the prism array when viewed from a perpendicular direction to the prism array,
wherein the first filter is slanted from the display toward the prism array to control a pass angle of the rays of the first hologram image by the multiple barriers and the second filter is slanted from the display toward the prism array to control a pass angle of the rays of the second hologram image by the multiple barriers.

15. The floating hologram apparatus of claim 14,
wherein the first display is positioned above the second display, and
the prism array is positioned in front of the first display and the second display.

16. The floating hologram apparatus of claim 14,
wherein a projection position for a floating hologram of the first hologram image and a projection position for a floating hologram of the second hologram image are controlled, respectively, depending on a difference between the first angle and the second angle.

17. The floating hologram apparatus of claim 14, wherein the first hologram image is an object image and the second hologram image is a background image.

18. The floating hologram apparatus of claim 17, wherein the first angle is greater than the second angle.

19. The floating hologram apparatus of claim 18, wherein the first display is positioned in front of the second display.

* * * * *